Nov. 27, 1962  E. C. ELSNER ETAL  3,065,987
PALLET LIFTING ATTACHMENT
Filed Jan. 29, 1962
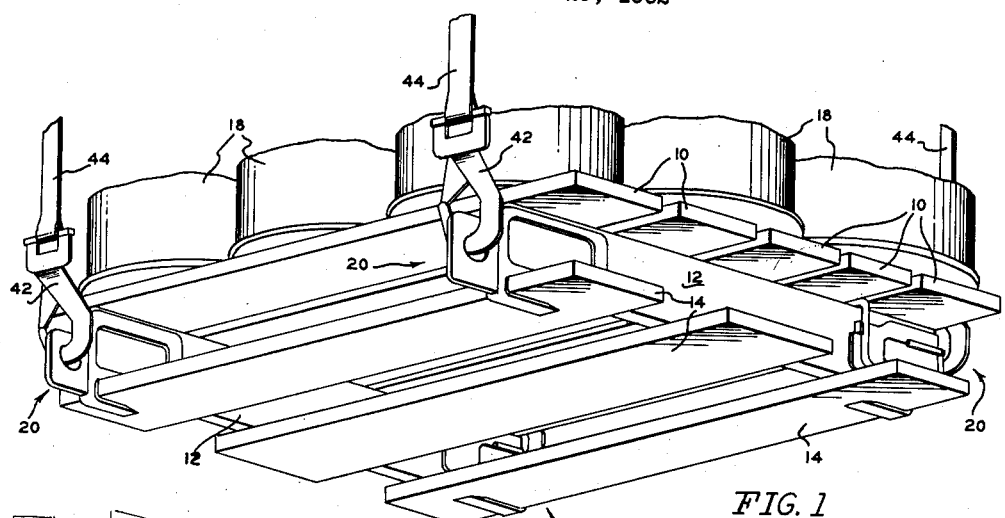
FIG. 1
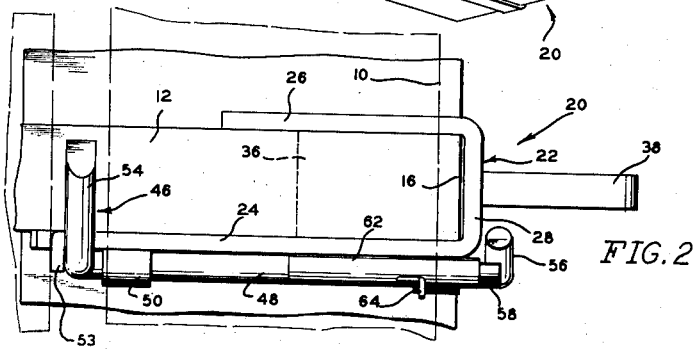
FIG. 2
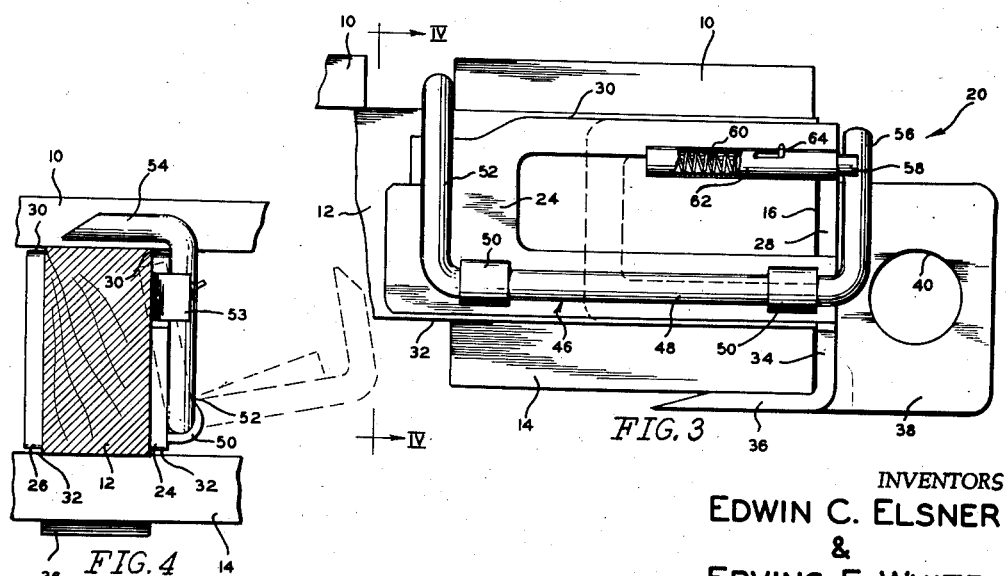
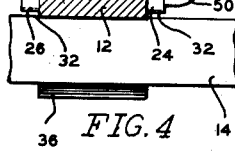
FIG. 4
FIG. 3
INVENTORS
EDWIN C. ELSNER
&
ERVING F. WHITE
BY
*Jerry K. Harness*
ATTORNEY United States Patent Office 3,065,987
Patented Nov. 27, 1962

3,065,987
PALLET LIFTING ATTACHMENT
Edwin C. Elsner, Pasadena, Calif., and Erving F. White, Jackson, Mich., assignors to Aeroquip Corporation, Jackson, Mich., a corporation of Michigan
Filed Jan. 29, 1962, Ser. No. 169,348
8 Claims. (Cl. 294—67)

The invention pertains to pallet lifting apparatus of the type which may be employed with conventional material handling pallets for permitting the same to be lifted by overhead hoisting devices.

Wood pallets are commonly employed in the material handling arts as a convenient means for facilitating simultaneous movement of a plurality of articles. Such pallets normally consist of a load platform defined by parallel spaced planks affixed to at least a pair of cross members and several base planks are usually affixed to the opposite side of the cross members in parallel relation to the platform planks above. The spacing between the platform and base planks permits the forks of a lift truck to be readily inserted therebetween for lifting and transporting the pallets and the articles mounted thereon. While conventional pallets need no modification or attachments for use with lift truck devices, difficulty is encountered when it is desired to lift conventional pallets by means of overhead hoists of the type which employ suspended cables, chains etc. In using pallets with overhead hoisting lifting devices, it is usually necessary to provide the pallets with eyes for attachment to the cables and hooks or cables must be passed completely under the pallet or the pallet must be cradled within a loading net or similar device.

Heretofore known devices for employing overhead hoist lifting devices with conventional pallets have been unsatisfactory, and it is the basic object of the invention to provide a pallet lifting attachment for permitting conventional material handling pallets to be readily lifted by overhead hoisting devices wherein the attachment is easily assemblable to and removable from the pallet, is of high strength, dependable and safe in operation, and readily manufacturable at an economical cost.

A further object of the invention is to provide a pallet lifting attachment which may be attached to a loaded pallet while the pallet is resting upon a supporting floor surface.

Another object of the invention is to produce a pallet lifting attachment for providing a load attachment location whereby the attachments may be used to pull the pallet in a horizontal direction, if desired.

Another object of the invention is to provide a pallet lifting attachment wherein the attachment may be readily assembled to a conventional pallet without special tools or equipment and may be locked and maintained upon the pallet whereby accidental disassembly of the attachment and pallet is prevented.

These and other objects of the invention arising from the details and relationships of the components of an embodiment of the invention will be apparent from the following description and accompanying drawings wherein:

FIG. 1 is an underside perspective view of a loaded suspended pallet employing pallet lifting attachments in accord with the invention, FIG. 2 is a top view of the end of a pallet cross member having an attachment affixed thereto with the platform planks in dotted lines for purposes of illustration, FIG. 3 is a side elevational view of a pallet lifting attachment in accord with the invention illustrating the locking lever in the locked position, and FIG. 4 is an elevational, sectional view taken along section IV—IV of FIG. 3.

The conventional type of pallet with which the invention may be employed is illustrated in FIG. 1, and is usually formed of wood. The pallet includes a plurality of parallel spaced platform planks 10 nailed or bolted to the upper side of a pair of parallel cross members 12. A number of base planks 14 (three are shown in the illustrated embodiment) are affixed to the underside of the cross members. It will be noted that the outer platform and base planks are affixed to the cross member 12 adjacent the end 16 thereof. The pallet supported load is illustrated as consisting of a plurality of cylindrical containers 18 resting upon the platform planks 10.

The pallet lifting attachment 20, in accord with the invention, is associated with the ends of the cross members 12. An attachment 20 is associated with each end of each cross member and all of the attachments are identical.

The attachments include a substantially U-shaped body member 22 having spaced parallel side portions 24 and 26 interconnected by a base portion 28. The side portion 24 is of greater length than the side portion 26 in that the locking lever is mounted thereon. The side portions are preferably provided with openings or notches for reducing the weight of the attachment and the side portions are provided with upper edges 30 and lower edges 32.

The base portion 28 is provided with an extension 34, FIG. 3, extending below the lower side portion edges 32 and a tongue member 36 perpendicularly depends from the extension in the longitudinal direction of the side portions. The tongue 36 is beveled at the free end to provide a sharp point to facilitate assembly of the attachment and to the pallet when loaded, as will be later described and is in spaced parallel relation to the lower edges 32.

A load lifting plate 38 is welded to the exterior of the base portion 28 and is provided with a hole 40 for receiving the hooks 42 of the cables 44 suspended from the overhead hoisting apparatus, not shown.

The interior width between the side portions 24 and 26 is only slightly greater than the width of the cross members 12 and the distance between the upper edge of the tongue 36 and the lower edges 32 is likewise only slightly gerater than the height or the thickness of the base planks 14. Thus, it will be appreciated that the body member 22 may be assembled to the end of the cross members 12 in the manner shown wherein the side portions 24 and 26 embrace the vertical sides of the cross member, the end 16 of the cross member nearly engages the base portion 28, the outer edge of the base plank substantially engages the extension 34 and the tongue 36 will pass under the outer base plank, gripping the base plank between the lower edges 32 and the tongue. Upon a vertical force being imposed upon the lifting plate 38, by the hooks 42 and cables 44, the association of the lower edges 32 with the top of the base plank and the tongue with the bottom thereof and the relationship of the end of the cross member with the base portion 28 will effectively permit the lifting forces imposed upon the attachment to be transmitted to the pallet for the lifing thereof.

To insure and maintain the assembly of the attachments 20 with the pallet, locking means in the form of a lever 46 are provided. The locking lever 46 includes a first horizontally disposed portion 48 pivotally mounted upon the side portion 24 by a pair of spaced bearing members 50 affixed to the side portion. A second lever portion 52 is perpendicularly disposed to the portion 48 extending in an upwardly direction and terminates in a third portion 54 perpendicular to the second portion which extends above the upper edges 30 toward the side portion 26 when the lever is in the operative position. The ear 53 is bent outwardly from the side portion 24 to support the lever portion 54. The locking lever 46 is shown in the operative position in the full lines of FIGS. 1 through 4. The position of the locking lever portions 52 and 54 relative to the base portion 28 is such as permit the portion 54 to be located in the space between the outermost and adjacent platform planks 10 whereby the portion 54 will overlap the upper surface of the cross member 12. Thus, when portion 54 is in the operative position, as illustrated, the attachment may not be axially pulled off the cross member due to the interference of the inner edge of the outer platform plank and portion 54.

The lever 46 is provided with a handle portion 56 perpendicularly disposed to the portion 48 and serves as both a handle for pivoting the locking lever and as an abutment for engagement with the sliding bolt latch 58 which is spring biased to the outward position by spring 60 and guided within tube 62 affixed to the side portion 24. The pin 64 is affixed to the bolt 58 and extends through a slot in the tube 62 for operating the bolt for movement in and out of an interference position with the handle portion 56. When in the operative position the bolt 58 will prevent the lever from turning in a clockwise direaction, FIG. 4, and upon sliding the bolt to the left, FIG. 3, the handle may be moved to swing the lever to an inoperative position, as shown in dotted lines in FIG. 4, to permit the attachment to be assembled to or removed from the pallet cross member.

The locking lever permits the pallet to be horizontally pulled about by a tractor or similar means attaching to the plates 38. Once the locking lever is in the operative position, the attachment cannot be disassembled from the pallet.

As it will often occur that the attachments 20 are not affixed to the pallet until after the pallet has been loaded and is resting upon a support surface, the beveled configuration of the tongue 36 permits the attachment to be hammered into position upon the pallet by aligning the attachment with the cross members and moving the locking lever to the inoperative position. By striking the end of the plate 38 the tongue 36 may be driven under the base plank and the attachment may be readily driven on and locked to the pallet. Removal of the attachments from the pallet is accomplished merely by shifting bolt 58 to a non-interfering position with regard to handle 56, pivoting the lever to the dotted line position of FIG. 4 and pulling the attachment away from the pallet.

It is understood that various embodiments to the invention may be apparent to those skilled in the art without departing from the spirit and scope thereof, and it is intended that the invention be defined only by the following claims.

We claim:

1. A pallet lifting attachment in combination with a pallet having elongated transversely disposed cross members having upper and lower surfaces and vertical sides, spaced platform members affixed to the upper surface thereof and base members attached to the lower surface thereof, comprising, U-shaped body member adapted to be placed over an end of the cross member engaging the vertical sides thereof, a tongue element affixed to said body member inserted under the base member adjacent the end of the cross member associated with said body member, means mounted on said body member operatively associating with said pallet restraining said body member against longitudinal movement relative to said cross member and lift attaching means defined on said body member.

2. In a pallet lifting attachment as in claim 1 wherein said means restraining said body member against movement relative to said cross member comprises locking means selectively insertable between said spaced platform members.

3. In a pallet lifting attachment as in claim 2 wherein said locking means comprises a lever pivotally mounted on said body member for selective movement between said spaced platform members and latch means mounted on said body member operatively associating with said lever for maintaining said lever between said platform members.

4. In a pallet lifting attachment as in claim 3 wherein said lever includes a hooked portion movable between said platform members, said hooked portion overlapping the upper surface of said cross members.

5. A pallet lifting attachment comprising, in combination, a U-shaped body member having substantially parallel side portions interconnected by a base portion, said side portions having upper and lower edges, an extension defined on said base portion extending below said lower edges, a tongue projecting from said extension in the longitudinal direction of said side portions and in spaced relation to said lower edges, locking means pivotally mounted on said body member for movement between operative and inoperative positions, a portion of said locking means remote from said base portion extending above said upper edges when in the operative position and lift attaching means defined on said body member.

6. In a pallet lifting attachment as in claim 5 wherein said locking means comprises a lever having a first portion extending parallel to one of said side portions and rotatably journaled thereon, a second lever portion perpendicularly disposed to and extending from said first portion remote from said base portion and a third portion perpendicular to and extending from said second portion in the direction of the other of said side portions above said upper edges.

7. In a pallet lifting attachment as in claim 6 wherein a fourth lever portion is perpendicularly disposed to and extends from said first portion adjacent said base portion and latch means mounted on said body member operatively associating with said fourth lever portion to maintain said lever in the operative position.

8. In a pallet lifting attachment as in claim 5 wherein said tongue is parallel to said lower side portion edges and the free end thereof is beveled.

References Cited in the file of this patent

UNITED STATES PATENTS 2,459,207    Worthington    Jan. 18, 1949
2,974,994    Goldsmith    Mar. 14, 1961